(12) United States Patent
Tsirkin et al.

(10) Patent No.: US 11,550,612 B2
(45) Date of Patent: Jan. 10, 2023

(54) SUPPORT FOR ENCRYPTED MEMORY IN NESTED VIRTUAL MACHINES

(71) Applicant: RED HAT, INC., Raleigh, NC (US)

(72) Inventors: Michael Tsirkin, Westford, MA (US); Karen Lee Noel, Concord, CA (US)

(73) Assignee: RED HAT, INC., Raleigh, NC (US)

( * ) Notice: Subject to any disclaimer, the term of this patent is extended or adjusted under 35 U.S.C. 154(b) by 256 days.

(21) Appl. No.: 16/913,879

(22) Filed: Jun. 26, 2020

(65) Prior Publication Data
US 2021/0406057 A1    Dec. 30, 2021

(51) Int. Cl.
*G06F 9/455* (2018.01)
*H04L 9/08* (2006.01)
*G06F 21/60* (2013.01)
*G06F 12/10* (2016.01)

(52) U.S. Cl.
CPC .......... *G06F 9/45558* (2013.01); *G06F 12/10* (2013.01); *G06F 21/602* (2013.01); *H04L 9/0819* (2013.01); *G06F 2009/45583* (2013.01); *G06F 2009/45587* (2013.01); *G06F 2212/654* (2013.01)

(58) Field of Classification Search
CPC .... G06F 9/45558; G06F 12/10; G06F 21/602; G06F 2009/45583; G06F 2009/45587; G06F 2212/654; H04L 9/0819
See application file for complete search history.

(56) References Cited

U.S. PATENT DOCUMENTS

| | | | |
|---|---|---|---|
| 10,146,570 B2 | 12/2018 | Wang et al. | |
| 10,437,627 B2 | 10/2019 | Hu et al. | |
| 10,445,247 B2 | 10/2019 | Das | |
| 2019/0087368 A1* | 3/2019 | Bhandari | ............ G06F 12/1009 |
| 2019/0108051 A1 | 4/2019 | Wang et al. | |
| 2022/0019698 A1* | 1/2022 | Durham | ............. G06F 9/45533 |

FOREIGN PATENT DOCUMENTS

WO    2019132976    7/2019

OTHER PUBLICATIONS

Laier, M. (2009). "Towards Power-Aware Memory for Virtual Machines", Faculty of Computer Science; KIT, 65 pages.
Gandhi, J. et al. (2014). "Efficient Memory Virtualization: Reducing Dimensionality of Nested Page Walks", Department of Computer Sciences University of Wisconsin-Madison Madison, WI, USA; AMD Research Advanced Micro Devices, Inc., 12 pages.
Xia, Y. et al. (2013). "Architecture Support for Guest-Transparent VM Protection from Untrusted Hypervisor and Physical Attacks", Institute of Parallel and Distributed Systems, Shanghai Jiao Tong University, 12 pages.

* cited by examiner

*Primary Examiner* — Edward J Dudek, Jr.
(74) *Attorney, Agent, or Firm* — Womble Bond Dickinson (US) LLP (57) ABSTRACT

A method includes receiving a memory access request comprising a first memory address and translating the first memory address to a second memory address using a first page table associated with the first virtual machine. The first page table indicates whether the memory of the first virtual machine is encrypted. The method further includes determining that the first virtual machine is nested within a second virtual machine and translating the second memory address to a third memory address using a second page table associated with the second virtual machine. The second page table indicates whether the memory of the second virtual machine is encrypted.

20 Claims, 6 Drawing Sheets

SUPPORT FOR ENCRYPTED MEMORY IN NESTED VIRTUAL MACHINES

TECHNICAL FIELD

Aspects of the present disclosure relate nested virtual environments, and more particularly, support for encrypted memory in nested virtual machines.

BACKGROUND

A hypervisor abstracts the physical resources of a computing device such as physical processing devices (e.g., processors, CPUs, etc.) and physical memory (e.g., RAM) into virtual resources. The hypervisor manages and assigns the virtual resources to virtual machines (VMs) running on the computing device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Secure encrypted virtualization (SEV) is a technology that is designed to isolate virtual machines (VMs) from a hypervisor, other VMs, and any other code that may coexist on the physical host at the hardware level. Thus, SEV may protect a virtual machine from physical security threats as well as other VMs and the hypervisor itself. SEV may also prevent the hypervisor from interfering with the functioning of the virtual machine. SEV allows a VM to mark selected pages as encrypted in the guest page table entries for that VM and uses a separate encryption key for each VM to provide isolation between VMs. However, SEV does not support encryption in nested virtualization (i.e., a virtual machine running within another virtual machine). In conventional systems, several issues arise in encrypting nested virtual machines. For example, both the parent and nested virtual machines may each have an associated shadow page table providing direct memory mapping for each of them. However, if the parent VM marks a page as encrypted but the nested VM does not, potential information leaks to the hypervisor may occur. Additionally, since the guest page tables of the nested VM may be encrypted (i.e., not accessible to the hypervisor due to encryption of the parent VM), the hypervisor may be unable to create extended page tables to shadow the guest page tables of the nested VMs.

Aspects of the disclosure address the above-noted and other deficiencies by providing support for encrypted memory in nested virtual machines. In particular, a context of a nested virtual machine may include a parent context pointer indicating the parent VM of the nested VM. Therefore, each nested virtual machine may be identified as nested. For each VM in a nested chain, rather than using a shadow table managed by the hypervisor, an address translation may be performed using a page table at each level of the VM chain. Each page table may include an indication of whether its associated VM has marked the page as encrypted. The parent context pointers may be used to identify the parent VMs so that the chain of address translations may be performed. Using the chain of page table address translations and encryption indications, every memory access goes through each parent VM's page table until the root VM is reached. Multiple VMs may mark the page as encrypted, thus an encryption key of the deepest nested VM marked as encrypted may be used to encrypt the page. For example, when the address translations are being performed, the processing device may note the first VM in the chain that is marked as encrypted and use that VM's encryption key.

Accordingly, the present disclosure provides for encryption support in nested virtual machines. The parent context pointer included in a VM context provides the ability to perform an address translation at each level of a chain of nested VMs. The chain of address translations also avoids needing the root hypervisor to manage a shadow page table for the nested VM and prevents information leaks due to unencrypted nested VMs. Furthermore, identifying the deepest VM that is encrypted ensures that SEV remains supported and that the memory is accessible to the VMs that need access to the encrypted memory.

Figure 1:
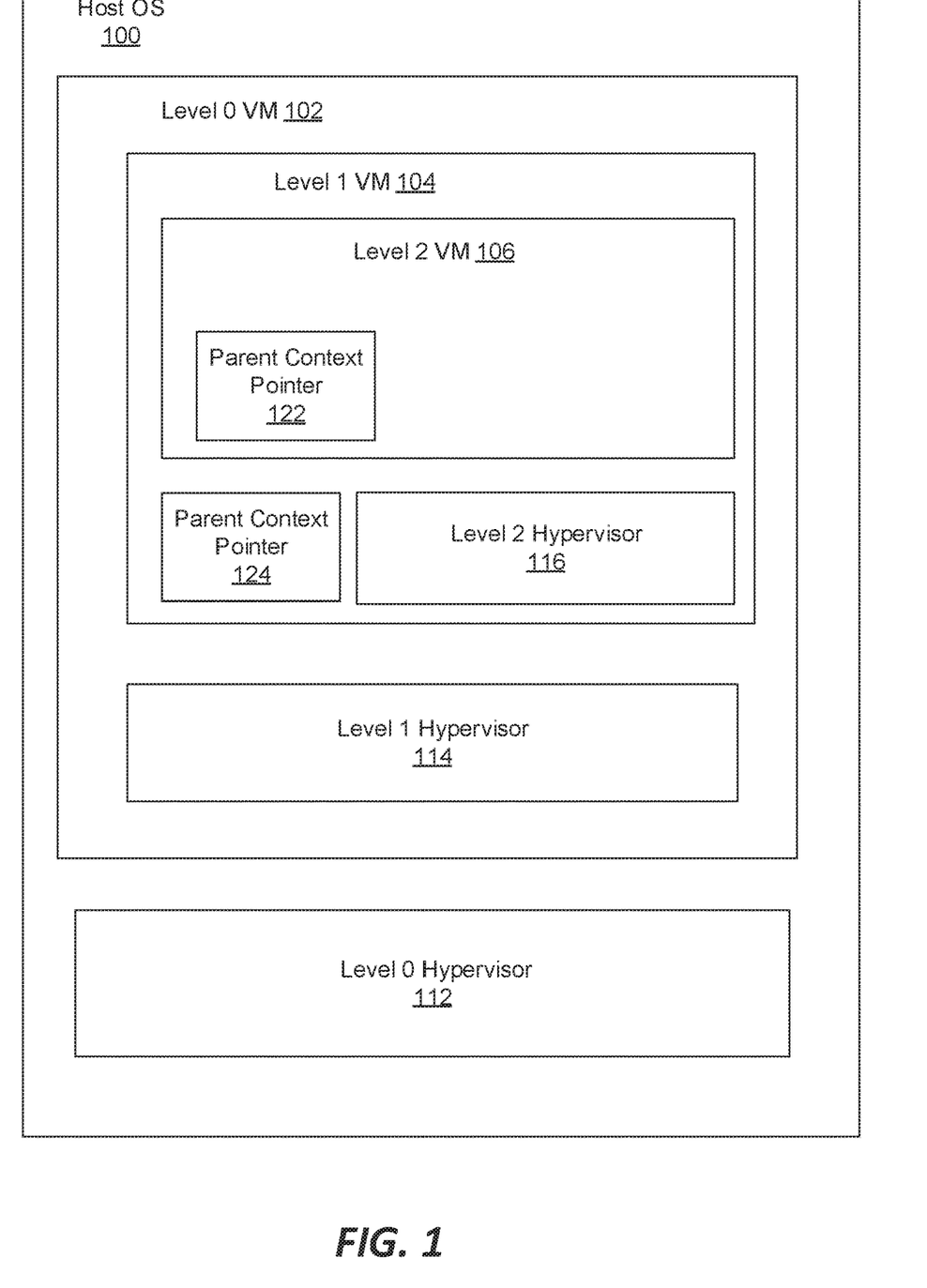
FIG. 1 is a system diagram that illustrates an example system for support of encrypted memory in nested virtual machines (VMs), in accordance with some embodiments.

FIG. 1 is a block diagram illustrating a system for supporting encrypted memory in nested virtual machines. The system may include a host OS 100 executing on a host machine, such as a server, a desktop computer, a laptop computer, a handheld device, or other computer hardware. Level 0 hypervisor 112 may execute on host OS 100. Level 0 hypervisor 112 may alternatively execute directly on the host machine without a host operating system. Level 0 hypervisor 112, also referred to as the root hypervisor, may manage execution of one or more VMs (e.g., Level 0 VM 102) on the host OS 100 (or directly on host machine). The level 0 VM 102 may execute one or more applications. Level 0 hypervisor 112 may assign and manage level 0 VM 102 access to hardware resources of the host machine, such as processors, memory, and peripheral devices, as well as host OS 100 resources. Level 0 hypervisor 112 may create virtual resources, the virtual resources emulating hardware resources, for the level 0 VM 102 to access. When the level 0 hypervisor 112 determines that a virtual resource is accesses, the level 0 hypervisor provides the appropriate hardware resources for use. Thus, the level 0 VM 102 may not access hardware resources directly.

A level 1 hypervisor 114 may execute on the level 0 VM 102 where the level 1 hypervisor 114 may further create and manage one or more level 1 VMs 104 on the level 0 VM 102. Level 1 hypervisor 114 may manage level 1 VM 104 access to resources of the level 0 VM 102. Thus, level 1 hypervisor 114 may provide an even further abstraction of the virtualized resources of the level 0 VM 102 for access by the level 1 VM 104. Level 1 VM 104 may include a parent context pointer 124 that identifies the level 0 VM context (i.e., the parent VM context of the level 1 VM 104).

Another hypervisor (level 2 hypervisor 116) may execute on the level 1 VM 104. The level 2 hypervisor may create and manage one or more level 2 VMs 106 on the level 1 VM 104. Level 2 hypervisor 116 may manage level 2 VM 106 access to resources of the level 1 VM 104. Thus, level 2 hypervisor 116 may provide an even further abstraction of the virtualized resources of the level 1 VM 104 for access by the level 2 VM 106. Level 2 VM 106 may also include a parent context pointer 122 that identifies the level 1 VM context (i.e., the parent VM context of the level 2 VM 106).

In some embodiments, when a nested VM attempts to access memory, processing logic for memory access may use the parent context pointer of the nested VM context to find a page table of the parent context. For example, when the level 2 VM requests access to memory (e.g., via a read or write request) the virtual address used by applications of the level 2 VM 106 needs to be translated to the actual physical address of the memory being accessed in hardware. Thus, the processing logic may identify a page table for the level 2 VM 106 as well as the parent context pointer 122 identifying the level 1 VM 104 as the parent VM. The processing logic may further identify a page table for the level 1 VM 104, based on the parent context pointer 122, and the parent context pointer 124 identifying the level 0 VM 102 as the parent of the level 1 VM 104. A page table for the level 0 VM 102 may be identified using the parent context pointer 124. A memory address translation may be performed at each level VM. Thus, a first address is translated into a second address using the level 2 VM 106 page table, the second address is translated into a third address using the level 1 VM 104 page table, and the third address into a fourth address using the level 0 VM 102 page table.

Furthermore, using SEV each of the VMs 102, 104 and 106 may control whether a memory page will be encrypted (private) or unencrypted (shared). A key derived from the deepest nested VM that indicated that the memory page will be encrypted is used for encryption. For example, level 2 VM 106 may mark selected pages of its guest memory as encrypted in its page table entries. In some embodiments, by setting a particular bit of a "physical address" (e.g., the address that guest page is translated to) to 1 in the page table entry (PTE). VMs 102 and 104 may also indicate that the page should be encrypted (i.e. a private page). However, because level 2 VM 106 is the deepest nested VM indicating encryption, accesses to that memory by the VM 1 may be automatically encrypted and decrypted by the AES engine in (e.g., a memory controller of) processing device using an encryption key derived from the level 2 VM 106. For memory pages marked as private, the processor may encrypt data with the proper AES encryption key when it is written to the memory page (e.g., DRAM) by the level 2 VM 106, and decrypt data using the AES encryption key when it is read by the level 2 VM 106. However, if a component other than the level 2 VM 106 writes data to a memory page marked as private, the processing device will not encrypt it with the level 2 VM 106 assigned key. This feature allows VMs to mark selected pages of memory data they want to keep confidential (private), and others to be used for communication with other VMs or the hypervisor, for example. For security, SEV requires certain types of memory (including instruction pages and page tables) to always be private to protect the VM.

Figure 2:
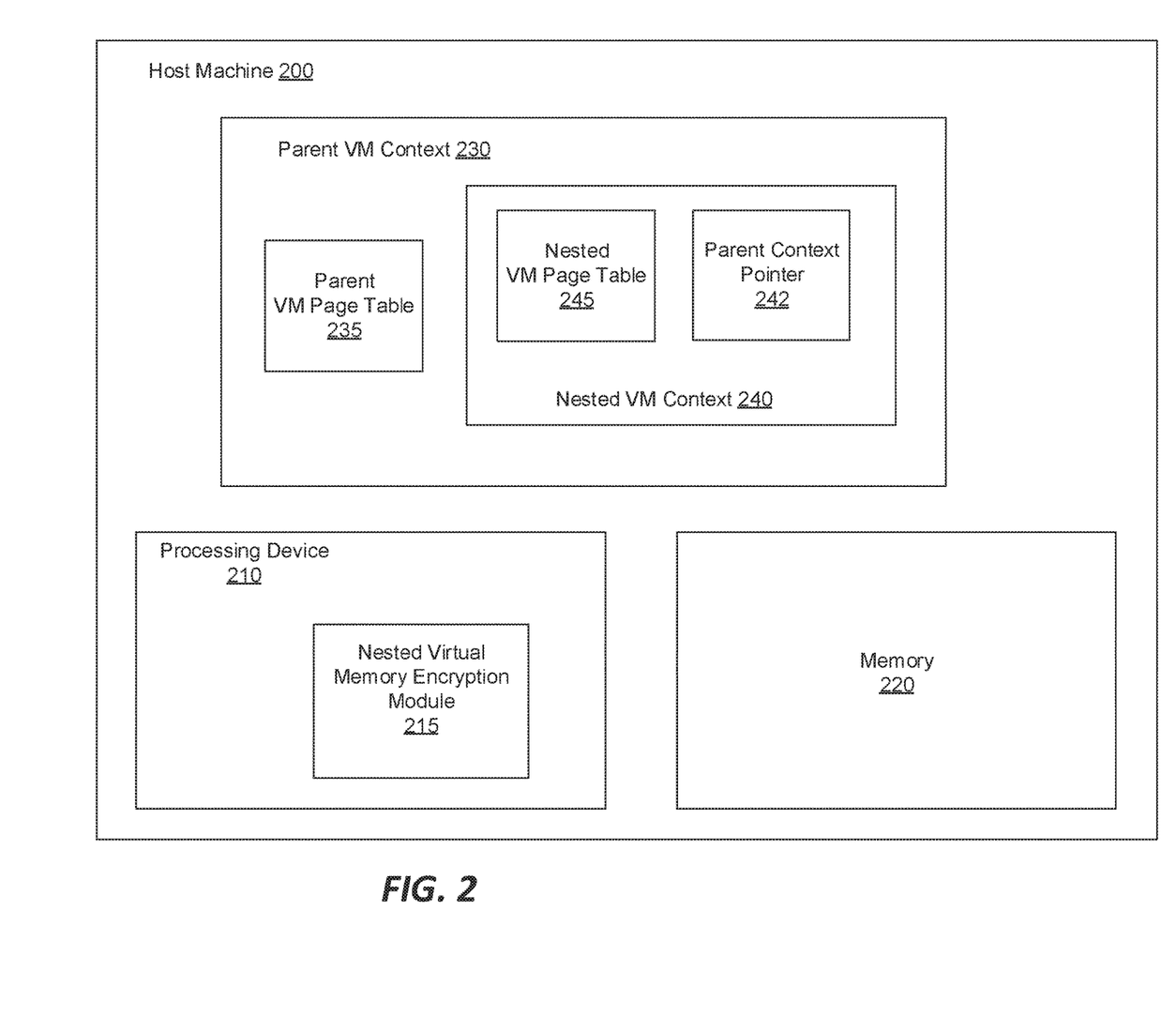
FIG. 2 is a block diagram that illustrates another example of a system for supporting encrypted memory in nested VMs, in accordance with embodiments of the disclosure.

FIG. 2 is a block diagram that illustrates another example system for supporting encrypted memory in nested virtual machines. The system 200 includes a processing device 210 and a memory 220. The system 200 may further include a parent VM context 230 which may include a parent VM page table 235 and a nested VM context 240. The nested VM context 240 may include a nested VM page table 245 and a parent context pointer 242. The memory 220 may include a parent VM memory 222 associated with the parent VM context 230 and a nested VM memory 224. In some embodiments, the nested VM memory 224 may be included within the parent VM memory 222 allocated for the parent VM context 230.

The processing device 210 may include (e.g., in a memory management unit) and/or execute a nested virtual memory encryption module 215. The nested virtual memory encryption module 215 may include logic to support encrypted memory in nested VMs. Nested virtual memory encryption module 215 may, in response to receiving a memory access request from a nested VM, translate a guest virtual address of the request to a first physical address using the nested VM page table 245 associated with the nested VM context 240. The nested virtual memory encryption module 215 may then determine whether the nested VM context 240 has a parent context pointer 242 identifying the parent VM context 230. The nested virtual memory encryption module 215 may then use the parent context pointer 242 to identify the parent VM context 230 and a parent VM page table 235 associated with the parent VM context 230. The nested virtual memory encryption module 215 may then perform another address translation using the parent VM page table 235 to translate the first physical address to a second physical address used to access the page in physical memory 220.

Figure 3:
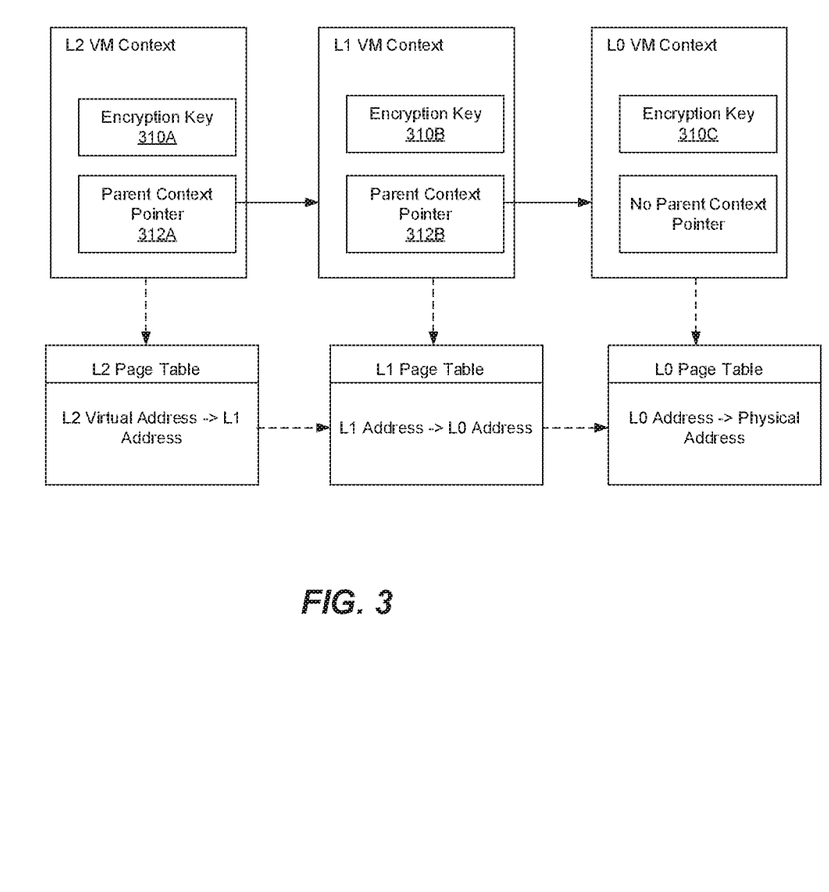
FIG. 3 is a block diagram illustrating a process flow for supporting encrypted memory in nested VMs, in accordance with some embodiments.

FIG. 3 is a block diagram illustrating an example memory page translation for a memory access from a nested virtual machine. Depicted are three different VM contexts, which may be nested within one another. L0 VM context may be a context of an L0 VM (root VM) while L1 VM context may be nested in the L0 VM context and L2 VM context may be nested further within the L1 VM context. Each VM context may include a parent context pointer, e.g., parent context pointer 312A of L2 VM context, and 312B of L1 VM context, if the VM is nested within another VM context (i.e., a parent VM). Thus, since L0 VM context is not nested within any other VM's, it may not include a parent context pointer, thus indicating that it is a root VM.

In one example, an L2 VM of the L2 VM context may request a memory access. To access the appropriate page of memory, an L2 virtual address used by applications of the L2 VM may be translated to an L1 address (i.e., in an address space of the L1 VM context). The processor may use the parent context pointer 312A to identify the L1 VM context and its associated L1 page table. The L1 page table may then be used to translate the L1 address to an L0 address (i.e., in an address space of the L0 VM context). The parent context pointer 312B of the L1 VM context may then be used to identify the L0 VM context and its associated L0 page table. Lastly, the L0 page table may be used to translate the L0 address to a physical address of physical memory. Thus, for a memory access, the accessed address may be translated through a page table for each parent VM until a root VM is found.

Additionally, during the memory address translation chain, processing logic may identify the deepest nested VM that indicates the memory page is encrypted. The processor may then use an encryption key derived from the identified VM to encrypt and decrypt the memory page. For example, in FIG. 3, if the L2 page table indicates that the page is to be encrypted, then the encryption key 310A associated with L2 VM context may be used to encrypt or decrypt the page, even if L1 VM and L0 VM both mark the page as encrypted as well. In another example, if the L2 page table does not indicate the page as encrypted but he L1 page table indicates the page as encrypted, then the encryption key 310B may be used to encrypt and decrypt the page. Similarly, if neither L2 page table or L1 page table indicate the page as encrypted but the L0 page table indicates the page as encrypted, then the encryption key 310 associated with the L0 VM may be used to encrypt and decrypt the page.

Figure 4:
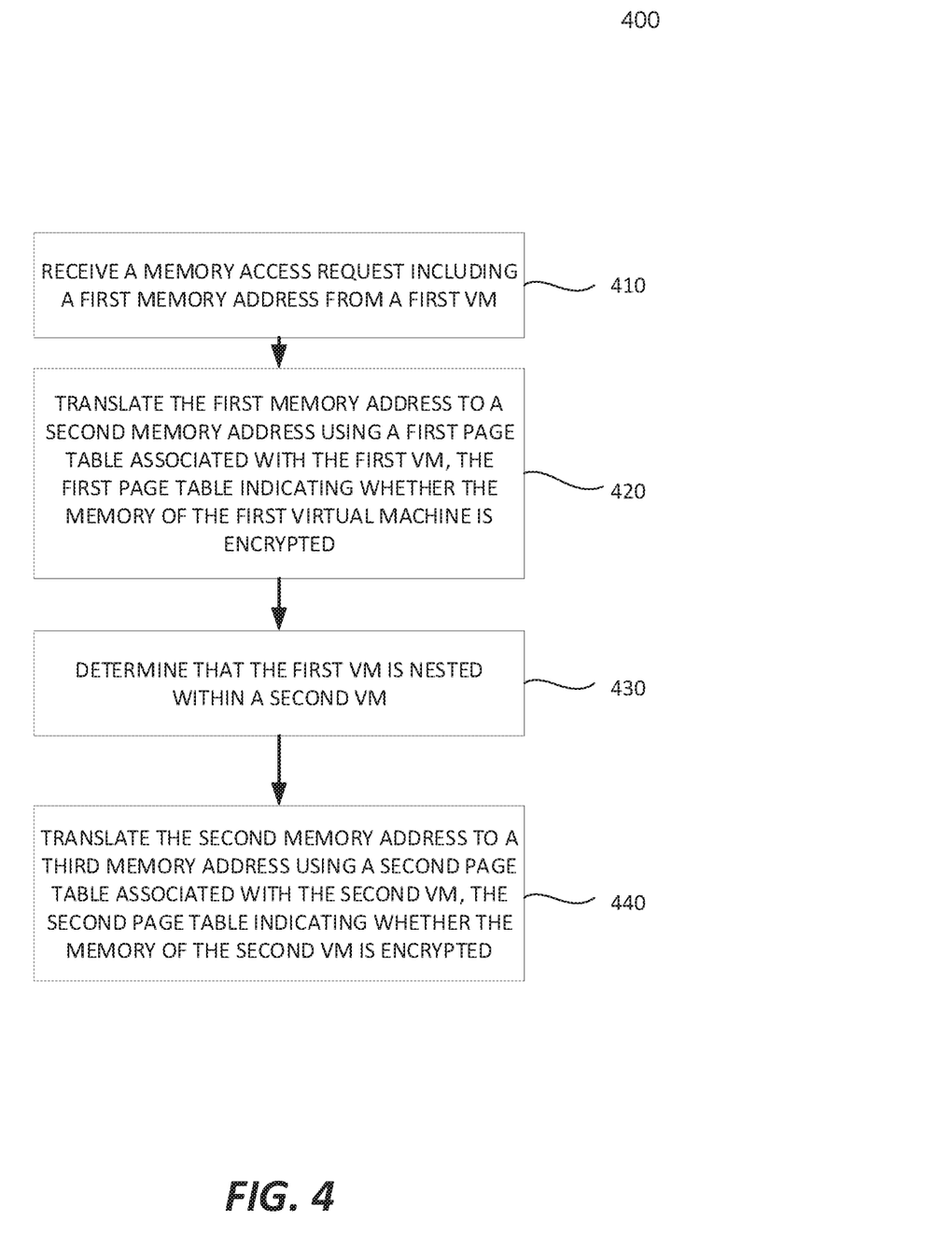
FIG. 4 is a flow diagram of a method of for supporting encrypted memory in nested VMs in accordance with some embodiments.

FIG. 4 is a flow diagram of a method 400 of supporting memory encryption in nested virtual machines, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by a nested virtual memory encryption module 215 of FIG. 2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives, from a first VM, a memory access request including a first memory address. The memory access may be a read, write, or other memory access operation. The VM may be a VM nested within another VM, referred to as a parent VM. The parent VM may also be nested within another VM and so forth. Alternatively, any number of VMs may also be nested within the first VM. The memory address may be an address used by a guest operating system of the VM and other applications executing on the first VM to perform operations. The memory address may thus be a guest virtual address of the first VM.

At block 420, the processing logic translates the first memory address to a second memory address using a first page table associated with the first VM, the first page table indicating whether the memory of the first VM is encrypted. As with traditional applications executing on a physical machine, the first page table may be used to map the first memory address (e.g., a guest virtual address) of the page to be accessed to a second memory address (e.g., a host physical address). Furthermore, the first page table may further include an indication of whether the page is encrypted, such as a particular bit of the second memory address (e.g., an encryption bit) that may be set for each page in the page table. In one example, the encryption bit is the highest bit of the second memory address.

Furthermore, the processing logic may note whether the first page table indicates that the page is encrypted (i.e., that the first VM is in a private/encrypted mode). If the page is indicated as encrypted by the first page table, once the physical memory is accessed an encryption key associated with the first VM may be used to encrypt or decrypt the memory page.

At block 430, the processing logic determines that the first VM is nested within a second VM. In one example, a context of the first VM may include a parent context pointer. The parent context pointer may be a pointer (e.g., an address pointer) that points to the address of the second VM context (i.e., the parent VM of the first VM). A nested hypervisor may execute within the second VM to manage the first VM within the second VM.

At block 440, the processing logic translates the second memory address to a third memory address using a second page table associated with the second VM, the second page table indicating whether the memory of the second VM is encrypted. Similar to block 420, the second page table may be used to map the second memory address to a third memory address. The second memory address may be a host physical address with respect to the first VM, but may be a guest virtual address with respect to the second VM. Thus, the second page table may similarly translate the guest memory address (with respect to the second VM) to a host physical address. Again, the second page table may include an indication of whether the page is encrypted. For example, a particular bit of the third memory address may indicate encryption, or a separate bit of the page table may indicate encryption.

In one example, if the page was already indicated as encrypted by the first page table of the first VM, then the processing logic may ignore the encryption bit of the second page table. In such a case, the processing logic may use an encryption key associated with the first VM to access the memory page. However, if the first page table does not indicate that the page is encrypted and the second page table does indicate that the page is encrypted, then an encryption key associated with the second VM may be used to access (e.g., encrypt/decrypt) the memory page. In other words, the VM that is nested the deepest and indicated as encrypted may be identified and an encryption key associated with that VM may be used to access the encrypted memory page.

Figure 5:
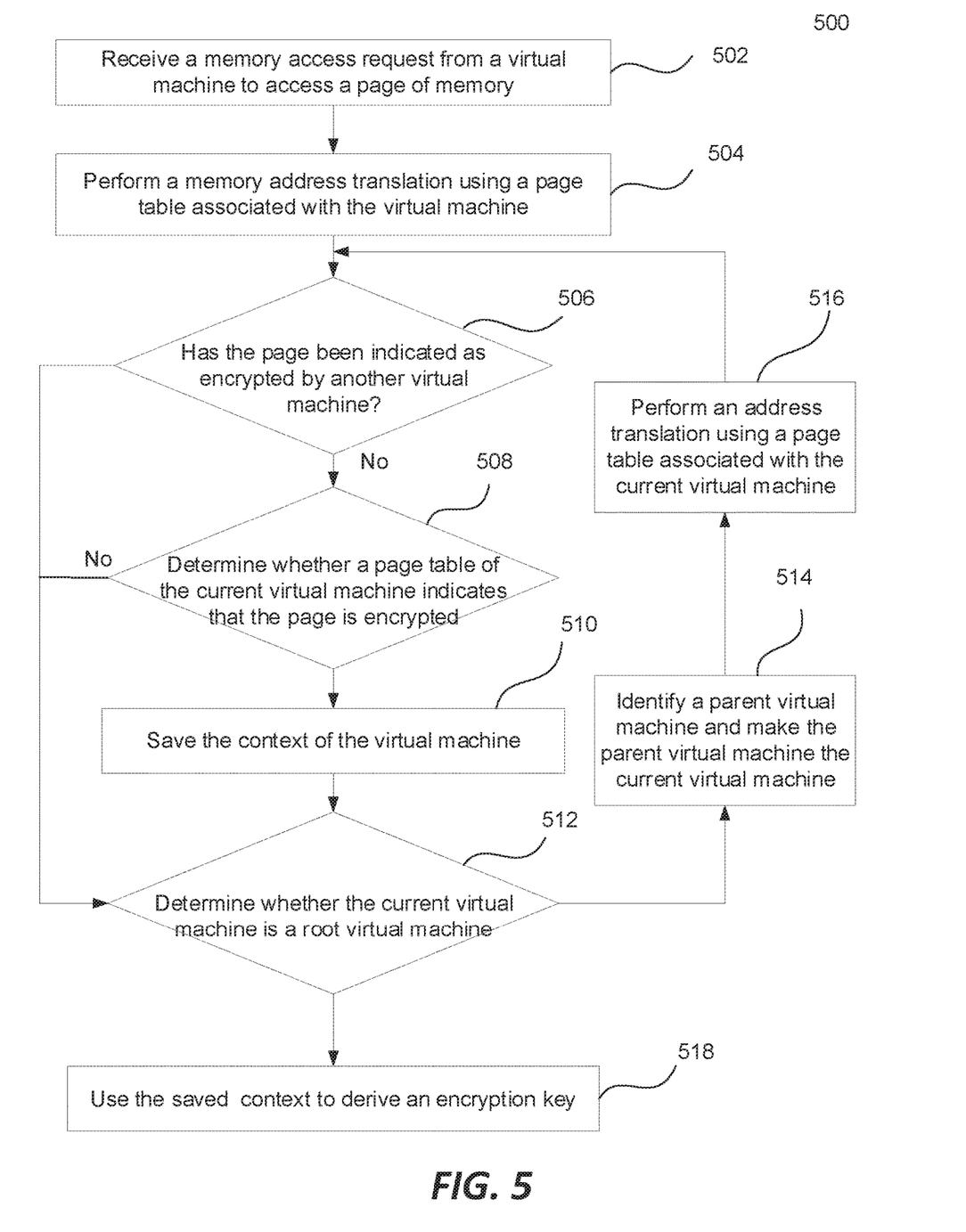
FIG. 5 is a flow diagram of another method of for supporting encrypted memory in nested VMs in accordance with some embodiments.

FIG. 5 is a flow diagram of a method 500 of supporting encrypted memory in nested virtual machines, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by nested virtual memory encryption module 215 of FIG. 2.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 502, where the processing logic receives a memory access request from a VM to access a page of memory. At block 504, the processing logic performs a memory address translation using a page table associated with the VM. At block 506, the processing logic determines whether the page has been indicated as encrypted by VM nested within the current VM. One or more VMs may be nested within the current VM and an address translation may be performed for each. However, if multiple VMs indicate the page as encrypted, conflicts may arise due to different encryption keys being used for each VM (as in SEV). To avoid this issue, the encryption key for the page is derived only from the deepest nested encrypted VM. Thus, if the page has not been indicated as encrypted by any earlier VMs in the translation process, the processing logic may move to block 508. At block 508, the processing logic determines whether the page table of the current VM indicates that the page is encrypted. At block 510, in response to both the page table of the current VM indicates that the page is encrypted and that no other VM has indicated the page as encrypted, the processing logic saves the context of the current VM.

At block 512, the processing logic determines whether the current VM is a root VM. For example, the processing logic may determine whether the current VM includes a parent context pointer. At block 514, the processing logic identifies the parent VM of the current VM. For example, the processing logic may identify the parent VM using a parent context pointer from the context of the current VM. The parent VM may then become the current VM to be used for another round of address translation. At block 516, the processing logic performs another address translation using a page table associated with the parent VM. Finally, at block 518, in response to reaching a root VM and completing the address translations, the processing logic derives an encryption key using the saved VM context. The encryption key may then be used to encrypt or decrypt the page of memory for use by the original requesting VM.

Figure 6:
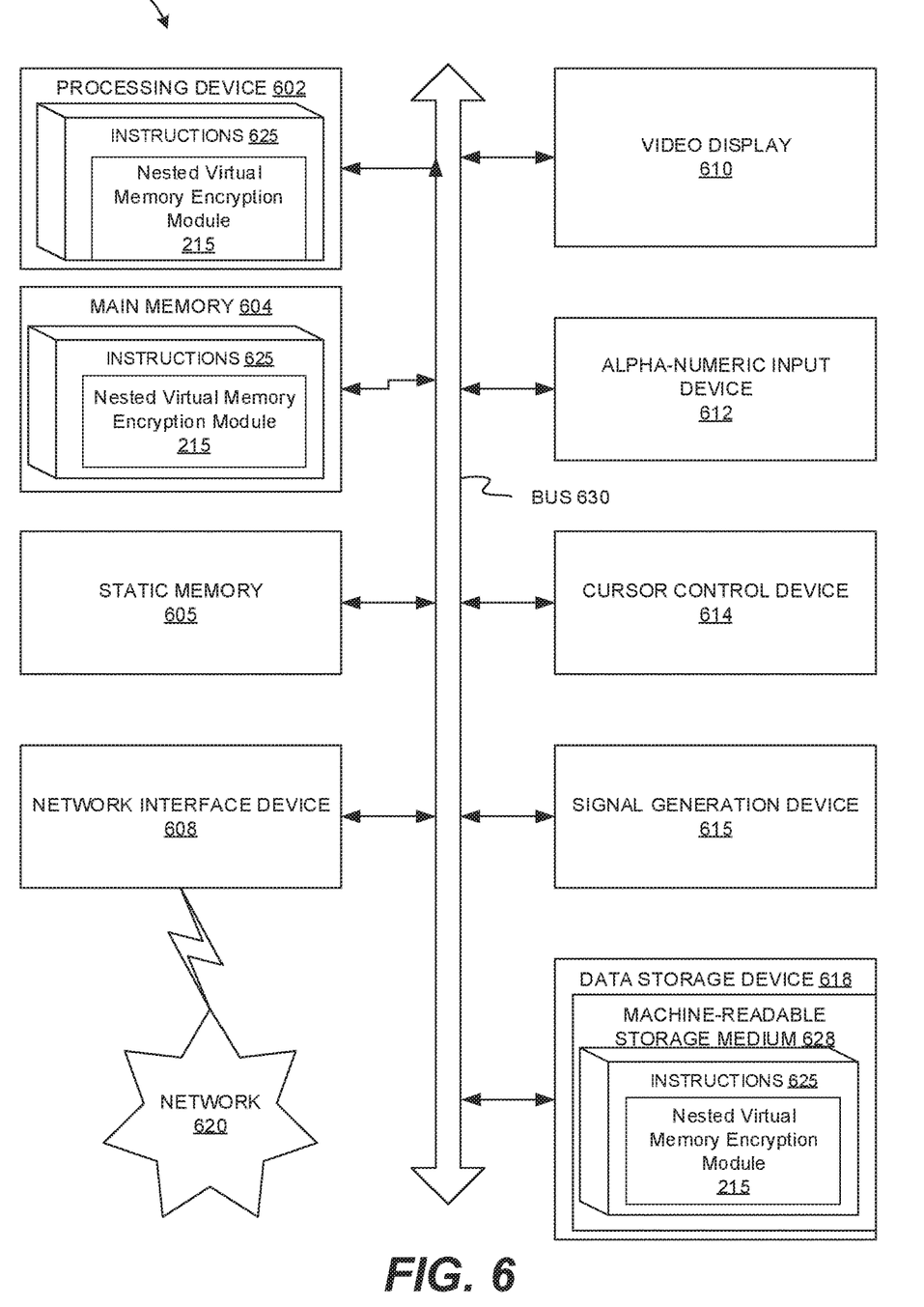
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a nested VM encryption module, e.g., nested VM encryption module 215, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, by a processing device from a first virtual machine, a memory access request comprising a first memory address;
translating the first memory address to a second memory address using a first page table associated with the first virtual machine, the first page table indicating whether memory of the first virtual machine is encrypted;
determining, by the processing device, that the first virtual machine is nested within a second virtual machine;
in response to determining that the first virtual machine is nested within the second virtual machine, translating, by the processing device, the second memory address to a third memory address using a second page table associated with the second virtual machine, the second page table indicating whether memory of the second virtual machine is encrypted;
determining from the first and second virtual machine, a deepest nested virtual machine that is encrypted; and
obtaining an encryption key associated with the deepest nested virtual machine that is encrypted.

2. The method of claim 1, wherein determining that the first virtual machine is nested within the second virtual machine comprises determining that a context of the first virtual machine comprises a parent context pointer for the second virtual machine.

3. The method of claim 1, further comprising:
obtaining a first encryption key associated with the first virtual machine for encryption of a page of memory associated with the second memory address in view of the first page table indicating that the second memory address is encrypted.

4. The method of claim 1, further comprising:
obtaining an encryption key associated with the second virtual machine in view of the first page table indicating that the second memory address is not encrypted and the second page table indicating that the third memory address is encrypted.

5. The method of claim 1, further comprising:
receiving a page fault associated with translating the second memory address to the third memory address;
in response to receiving the page fault, switching to a context of the second virtual machine; and
updating the second page table with a mapping of the second memory address to the third memory address.

6. The method of claim 1, further comprising:
determining, by the processing device, that the second virtual machine is nested within a third virtual machine; and
translating, by the processing device, the third memory address to a fourth memory address using a third page table associated with the third virtual machine, the third page table indicating whether memory of the third virtual machine is encrypted.

7. The method of claim 6, further comprising:
determining from the first, second, and third virtual machine, a deepest nested virtual machine that is encrypted; and
obtaining an encryption key associated with the deepest nested virtual machine that is encrypted.

8. A system comprising:
a memory; and
a processing device operatively coupled to the memory, the processing device to:
receive, from a first virtual machine, a memory access request comprising a first memory address;
translate the first memory address to a second memory address using a first page table associated with the first virtual machine, the first page table indicating whether the memory of the first virtual machine is encrypted;
determine that the first virtual machine is nested within a second virtual machine;
in response to determining that the first virtual machine is nested within the second virtual machine, translate the second memory address to a third memory address using a second page table associated with the second virtual machine, the second page table indicating whether the memory of the second virtual machine is encrypted;
determine from the first and second virtual machine, a deepest nested virtual machine that is encrypted; and
obtain an encryption key associated with the deepest nested virtual machine that is encrypted.

9. The system of claim 8, wherein to determine that the first virtual machine is nested within the second virtual machine the processing device is to determine that a context of the first virtual machine comprises a parent context pointer for the second virtual machine.

10. The system of claim 8, wherein the processing device is further to:
obtain an encryption key associated with the first virtual machine for encryption of a page of memory associated with the second memory address in view of the first page table indicating that the second memory address is encrypted.

11. The system of claim 8, wherein the processing device is further to:
obtain an encryption key associated with the second virtual machine in view of the first page table indicating that the first memory address is not encrypted and the second page table indicating that the third memory address is encrypted.

12. The system of claim 8, wherein the processing device is further to:
receive a page fault associated with translating the second memory address to the third memory address;
in response to receiving the page fault, switch to a context of the second virtual machine; and
update the second page table with a mapping of the second memory address to the third memory address.

13. The system of claim 8, wherein the processing device is further to:
determine, by the processing device, that the second virtual machine is nested within a third virtual machine; and
translate, by the processing device, the third memory address to a fourth memory address using a third page table associated with the third virtual machine, the third page table indicating whether the memory of the third virtual machine is encrypted.

14. The system of claim 13, wherein the processing device is further to:
determine from the first, second, and third virtual machine a deepest nested virtual machine that is encrypted; and
obtain an encryption key associated with the deepest nested virtual machine that is encrypted.

15. A non-transitory computer-readable storage medium including instructions that, when executed by a processing device, cause the processing device to:
receive, by the processing device from a first virtual machine, a memory access request comprising a first memory address;
translate the first memory address to a second memory address using a first page table associated with the first virtual machine, the first page table indicating whether memory of the first virtual machine is encrypted;
determine, by the processing device, that the first virtual machine is nested within a second virtual machine;
in response to determining that the first virtual machine is nested within a second virtual machine, translate, by the processing device, the second memory address to a third memory address using a second page table associated with the second virtual machine, the second page table indicating whether memory of the second virtual machine is encrypted;
determine from the first and second virtual machine, a deepest nested virtual machine that is encrypted; and
obtain an encryption key associated with the deepest nested virtual machine that is encrypted.

16. The non-transitory computer-readable storage medium of claim 15, wherein to determine that the first virtual machine is nested within the second virtual machine the processing device is to determine that a context of the first virtual machine comprises a parent context pointer for the second virtual machine.

17. The non-transitory computer-readable storage medium of claim 15, wherein the processing device is further to:
obtain a first encryption key associated with the first virtual machine for encryption of a page of memory associated with the second memory address in view of the first page table indicating that the second memory address is encrypted.

18. The non-transitory computer-readable storage medium of claim 15, wherein the processing device is further to:
obtain an encryption key associated with the second virtual machine in view of the first page table indicating that the second memory address is not encrypted and the second page table indicating that the third memory address is encrypted.

19. The non-transitory computer-readable storage medium of claim 15, wherein the processing device is further to:
receive a page fault associated with translating the second memory address to the third memory address;

in response to receiving the page fault, switch to a context of the second virtual machine; and update the second page table with a mapping of the second memory address to the third memory address.

20. The non-transitory computer-readable storage medium of claim 19, wherein the processing device is further to:

determine a deepest nested virtual machine that is encrypted; and obtain an encryption key associated with the deepest nested virtual machine that is encrypted.

* * * * *